Feb. 14, 1961   P. KARNOW ET AL   2,971,273
PERFORMANCE BAR

Filed April 25, 1960   3 Sheets-Sheet 1

INVENTORS
PAUL KARNOW
ROBERT M. HERRICK
BY

AGENT

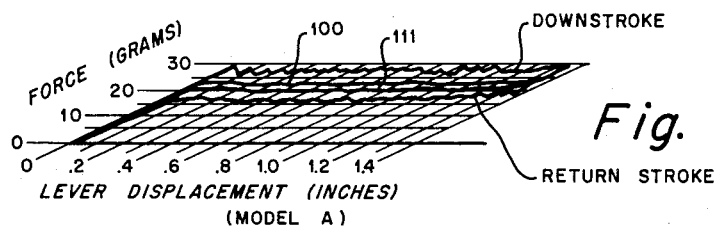
Fig. 7 (MODEL A)
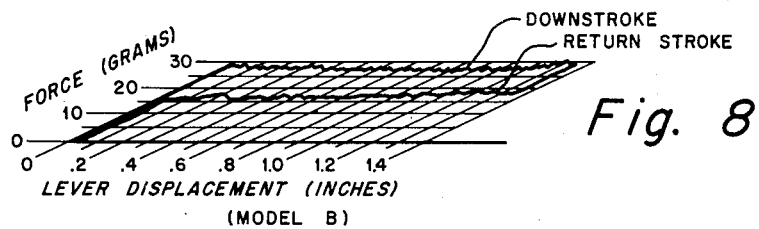
Fig. 8 (MODEL B)
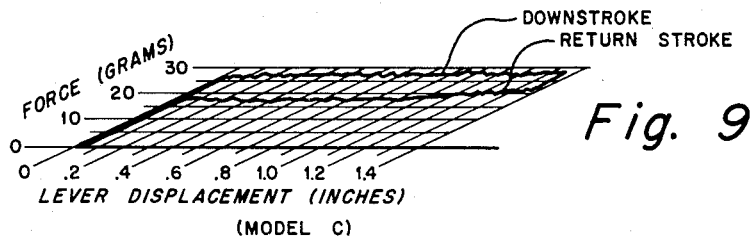
Fig. 9 (MODEL C)
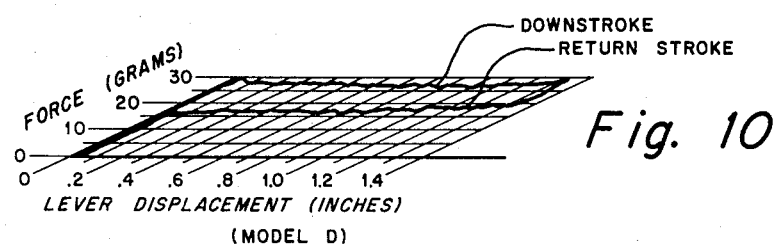
Fig. 10 (MODEL D)
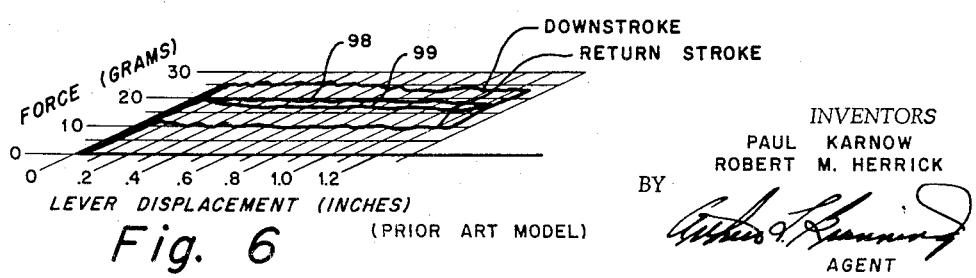
Fig. 6 (PRIOR ART MODEL)
INVENTORS
PAUL KARNOW
ROBERT M. HERRICK
AGENT Feb. 14, 1961 P. KARNOW ET AL 2,971,273
PERFORMANCE BAR
Filed April 25, 1960 3 Sheets-Sheet 3

INVENTORS
PAUL KARNOW
ROBERT M. HERRICK
BY
AGENT

United States Patent Office 2,971,273
Patented Feb. 14, 1961

2,971,273
PERFORMANCE BAR

Paul Karnow, Philadelphia, and Robert M. Herrick, Hatboro, Pa., assignors to the United States of America as represented by the Secretary of the Navy Filed Apr. 25, 1960, Ser. No. 24,628

10 Claims. (Cl. 35—22)

(Granted under Title 35, U.S. Code (1952), sec. 266)

The invention described herein may be manufactured and used by or for the Government of the United States of America for governmental purposes without the payment of any royalties thereon or therefor.

The present invention relates to a device useful in connection with research problems and experimental psychology, and more particularly relates to a performance bar device.

As pointed out in the inventors' copending application Serial No. 809,890 filed April 29, 1959, and entitled "Performance Bar," one of the foremost problems confronting designers of space vehicles is the determination of the motor capabilities of living occupants of a manned space vehicle wherein acceleration may be varied between zero and thirty gravities. At the present time considerable human material resources are being expended in a search for information which will help solve the problems confronting the designers of space vehicles so that the risk to lives of occupants of manned space vehicles may be reduced to a minimum.

More particularly, it is most important that a performance bar be provided that is not so seriously affected by changes in gravitational forces as to influence the test being conducted. Accordingly, the provision of a performance bar of the lightest possible construction and the most compact arrangement is contemplated so that a relatively lightweight mass-balanced lever is relatively unaffected during accelerations of from zero to thirty gravities.

One of the principal objects of the invention, therefore, is the provision of a new performance bar which has the lightest possible construction and the most compact arrangement.

Another object of the invention is the provision of a performance bar having a lightweight mass-balanced lever that is relatively undetectably affected during accelerations of from zero to thirty gravities.

Another object of the invention is the provision of an improved performance bar of all magnesium construction and having reduced bearing sizes, a circularly machined housing of reduced size and weight, a shortened counter balance lever, and internal components provided in a most advantageous arrangement so as to fit within a smaller housing.

Yet another object of the invention is the provision of an improved performance bar useful for the training of animals, the performance bar being of the smallest practical size and weight so as to be movable by the same magnitude of force regardless of the magnitude of any acceleration forces.

A still further object of the invention is the provision of an improved performance bar, as set forth in the preceding objects, comprising two opposed negative tape-like springs of constant torque so as to power the lever and further comprising an electrical commutator system which provides lever displacement information.

Another object of the invention is the provision of an improved performance bar of such lightweight construction that the overall weight thereof is as little as 0.24 lb., approximately, or less than half the total weight of prior art devices.

The invention further resides in certain novel features of construction, combinations and arrangements of parts, and further objects and advantages of the invention will be apparent to those skilled in the art to which it pertains from the following description of the preferred embodiment thereof, described with reference to the accompanying drawings in which similar reference characters represent corresponding parts throughout the several views, and in which:

Fig. 6 is a graphic illustration of a prior art prototype performance bar illustrating lever displacement vs. the amount of force required to displace the lever;

Figs. 7, 8, 9 and 10 are each graphic illustrations of four different performance bars embodying the invention respectively illustrating lever displacement vs. the amount of force required to displace the lever;

Figures 1, 2, 3, 4, 5:
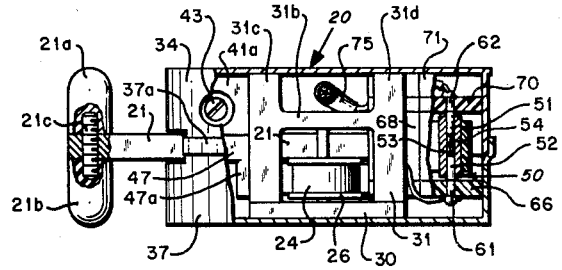
Fig. 1 is a top plan view of a device embodying the invention with part of the housing removed and with parts broken away and in section to show details of the construction of the internal mechanism of the device.
Fig. 2 is a front elevational view of Fig. 1, but with a part of the housing removed to show further details of the device's internal mechanism.
Fig. 3 is an end elevational view of Fig. 1.
Fig. 4 is a back elevational view of the device in Fig. 1.
Fig. 5 is a side elevational view of an adjustable stop and indicator subassembly forming part of the device partially shown in Fig. 2, the housing being shown in hidden outline.

It is to be further understood that the invention is not limited to the details of construction and arrangement of parts shown in the drawings and hereinafter described in detail, but is capable of being otherwise embodied and being practiced and carried out in various ways. It is further to be understood that the phraseology or terminology employed herein is for the purpose of description and there is no intention to herein limit the invention beyond the requirements of the prior art.

Referring to Figs. 1 through 6, the invention is shown embodied in a training or test device, indicated generally by the reference numeral 20. The performance bar 20 embodying the invention is useful in various ways for carrying out experiments in behaviorial psychology. Some of the behavior areas that can be studied with the use of the invention include the study of differentiation response of a small animal such as a rat, response generalization, variability of behavior, and the effect of environmental variables upon behavior wherein the test animal is subjected to drugs, feedback, temperature, acceleration, and motivation variations and environment. It is contemplated that the performance lever will find a number of widespread uses over and above those mentioned above in behaviorial laboratories throughout the world. More particularly, the instant invention is considered of optimum suitability for space satellite applications whereas prior art devices were considered too large and heavy for optimum use. It is also contemplated that construction changes may be made to make the device suitable for use with animals of various sizes as well as for use by human beings.

The device 20 comprises a spring biased performance bar 21, which is a simple lever, adapted to be operated by a small animal, such as a rat, trained to press the bar 21 downwardly to a predetermined or selected position for the purpose of obtaining food. Each discrete position of the bar is indicated or signaled by electrical means on a display panel, not shown.

The bar 21 has a handle at its outer end comprised of two stud nuts 21a, 21b. A screw 21c is threaded throughout its length and is threaded through the lever 21 so that its ends project from both sides of the lever 21. The nuts 21a, b are threaded onto the projecting ends. The bar 21 is fixed at an intermediate point by means of a shaft 22 to a power drum 23. By pressing the bar 21 downwardly, a pair of reverse wound, constant torque, tape-like springs 24 and 25, respectively coiled about oppositely disposed and vertically arranged takeup drums 26 and 27, are wound on the power drum 23. The coils of the springs 24 and 25 assume their natural diameter and are unstressed on the drums 26 and 27, respectively.

The shaft 22, by which the power drum 23 and the lever 21 are fixed together comprises a dowel pin 22, which has both ends reduced in diameter and slightly chamfered for being seated within a pair of coaxial anti friction bearings. Similarly, the take-up drums 26 and 27 are fixed to pins 28, 29 which are journaled in pairs of bearings. The pins 28, 29 are centrally located within vertically extending support members or stanchions 30, 31. The support member 30 has the shape of an I-beam section with laterally extending parallel flange portions or feet 31b at both ends of a central web portion 30a. The feet on the left hand side, Fig. 2, are slightly thicker than the feet on the right hand side so as to each accommodate a hole for a locating pin 33.

The support member 31, which may be referred to as a block, has a vertical cross-section identical to that of member 30. However, as seen in Figs. 1 and 2, the member 31 in addition to the central vertical web 31a has an H-shaped horizontal cross-section at the foot ends 31b thereof formed by transverse beams 31c, d, e, f, respectively, at the four corners of the block 31. The locating pins 33 extend throughout the length of and slightly beyond the beams 31c and 31e into the flat bottom or backside of housing receptacle portion 34. The stanchion 30 is secured to the block 31 by means of two diametrically aligned countersunk Philips head screws, only one screw 35 being shown in Fig. 2, threaded through the foot portions 30b into the beams 31c and 31f.

The block 31 is fixed against the backside or bottom wall inside the housing receptacle portion 34 by means of four countersunk, flat-headed screws 36, Fig. 6, threaded into the beams 31c, d, e, f of the block 31. The locating pins 33 extend into circular openings in the housing receptacle portion 34. The inside diameter of the housing receptacle portion are so dimensioned that the cylindrical inner wall 34a are contiguous with the outside corners of the block 31. The wall 34a has a height of approximately half the length of the beams 31c, d, e, f.

A removable cup-shaped housing cover 37 is provided with a diametrically enlarged peripheral lip 37a for telescoping over the wall 34a of the housing receptacle portion 34. Two diametrically aligned screws 38 are passed through the cover 37, the feet 30b of the stanchion member 30 and threaded into the beams 31d and 31f to fasten the cover 37 in place. The height of the cylindrical wall of the cover 37 is slightly greater than the height of the wall 34a.

The rims of the housing receptacle portion 34 and cover 37 are each formed with an arcuate, rectangularly shaped slot 34b and 37b, Fig. 3, for accommodating the lever 21 therein. The slot has an arcuate length of about sixty degrees. In order to limit the maximum displacement of the lever 21, an adjustable stop sub-assembly, indicated generally by the reference numeral 40, Fig. 5, is comprised of a generally U-shaped bed or bracket 41, having an adjustable stop member 42 adapted to travel along a lead screw 43. The lead screw 43 extends through a head block portion 41a and through the stop 42 into a drill hole 41b of a tail block portion 41c of the bracket 41. A lock screw 44 is provided on the lead screw 43 between the head block 41a and the stop 42 for permitting the locking of the lead screw 43 into position. Preferably, several plain thrust washers 45 are provided on the screw 43 between the head of the screw 43 and the lock nut 44. The bracket 41 is secured within the housing receptacle portion 34 to the back wall of the latter by means of two screws 46, Figs. 4 and 5, threaded into bracket 41.

A rectangular slot 41d is formed longitudinally of a flat portion 41e of the bracket 41 for permitting the visual inspection of the location of the adjustable stop 42, Fig. 2. A rectangular slot 34c is formed in the backside of the housing receptacle portion 34, Fig. 4, which slot 34c is aligned with the slot 41d. If desired, a linear scale may be printed, engraved, or otherwise marked on one edge of the slot 34c for aiding in the adjustment of the stop 42.

The adjustable stop 42 is provided with an arcuate, cylindrical stop surface 42a for providing a horizontal straight line contact with the undersurface of the lever 21. A pointer 42b is formed on the adjustable stop 42 and cooperates with the linear scale marked on the back of the housing receptacle 34, Figs. 4 and 5. A fixed stop 47 is generally L-shaped and comprises a flange 47a for permitting the stop 47 to be fastened with a screw 48 to the left hand side of the beam 31c in such a manner that a perpendicularly projecting stop flange 47b is in the upper end of the swing path of the lever 21. The flange 47b is formed with an arcuate or cylindrical stop surface portion 47c for being engaged by the lever 21 in a straight, horizontal line contact.

The position of the lever 21 is signalled to a remote location by means of electrical switch or circuit closing means, indicated generally by the reference numeral 50, mounted on the inner end of the lever 21, Figs. 1 and 2. Preferably, the enlarged inner end portion 21d of the lever 21 is made of brass whereas the balance of the lever 21 is made of magnesium for the purpose of mass balancing the lever about its pivot axis. More particularly, the switch 50 comprises a commutator system having a pair of coaxial, cylindrical silver-graphite brushes 51, 52 resiliently biased outwardly of a bushing 53 by means of a hair spring 54 for engaging two sets of five arcuately aligned platinum contacts 61 and 62. All five contacts are fixed in a generally sector-shaped insulator 66, which also serves as a support for these contacts. Four screws 67 extend through insulator 66 into a pair of angularly-spaced brass spacer sectors 68 to secure the insulator in place. Similarly, an insulator 70 which has the five contacts fixed therein, and a second pair of angularly-spaced brass spacer sectors 71 are held in place in the housing receptacle portion 34 by means of four screws 73 which extend through the back of housing 34, Fig. 5.

All of the electrical leads are enclosed in a cable housing 75 which extends through a rubber grommet 76 mounted in a circular opening in the wall 34a of the housing portion 34. Five of the leads are preferably electrically grounded. Each of the contacts are soldered to a grounded electrical lead. A sixth electrical lead is connected to a supply of electrical energy and is electrically series connected to the contacts 61. Accordingly, the angular position of the lever arm may be signalled, preferably by a set of five lamp filaments electrically connected to each of the five grounded leads. It will be noted that the lamp filaments are electrically connected in parallel and that an alternating current power supply may be used in lieu of a direct current power supply.

The switch 50 extends between the insulators 66 and 70, and if desired, a second switch means, similar to the switch 50, can be provided adjacent the switch 50 in the end of the lever 21. In this case, a second set of contacts would be required. Also, the number of contacts 61 and 62 can be changed to meet individual requirements.

The use of silver-graphite brushes and platinum contacts is preferable for best results but is not considered mandatory.

The receptacle 34 is provided with arcuately extending flanges 80 and 81 to permit the device 20 to be mounted on a support base, not shown, by means of screws for which screw holes 82 have been provided. The flanges 80 and 81 do not extend entirely around the periphery of the receptacle 34 as the ends thereof terminate along parallel chords on either side of a vertically and diametrically extending center line of the stanchions 30, 31. As a result, the lever 21 is unencumbered in its movement by either of the flanges 80, 81. The flanges 80, 81 are formed and cut with due care to the balance of the entire device 20 so that the latter may be both statically and dynamically balanced as nearly as possible about all three axes.

Referring to Figs. 7, 8, 9 and 10, the force vs. displacement recordings were obtained with a cross-slide pen recorder, not shown. A slide drawn by hand, pulls a scale connected to the handle of the lever 21 of the performance bar 20, and at the same time pulls a plotting board crosswise so that a pen attached to the scale's indicator records the resultant motion. The graphs, Figs. 7-10, so produced are oblique with the ordinates sloped approximately 2:1. The pen is adjusted so that it has a very small gap to the paper with capillary flow of the ink providing virtually friction-free recording. The pulls on both the scale and the lever 21 do not remain tangential throughout the recording motion; however, the resulting errors in the recordings are considered negligible.

The graphs of Figs. 7-10 are considered to be a remarkable graphical proof of the constant force capability of the performance bar 21. The very small waves in the recordings are variations due to the minute roughness remaining in commutator contacts 61, 62, brushes 51, 52, springs 24, 25 and bearings 28, 29 and also possibly minute dust particles. These variations are too small to be felt by human or animal operators. The recordings obtained on vellum of four different performance bars hereinafter referred to as models A, B, C, D devices, embodying the invention show remarkably consistent results, Figs. 7-10, respectively.

For purposes of comparison, a graphical illustration of force vs. displacement of a prior art device is shown in Fig. 6. The prior art performance bar, for purpose of obtaining a meaningful comparison, was provided with 75 percent silver—20 percent graphite commutator brushes of 0.093 inch diameter. It will be noted that the forces recorded in Figs. 7-10 were consistently between 15 and 30 grams while the forces recorded in Fig. 6 required more than 30 grams force for depressing the lever and less than 10 grams return force.

Figure 11:
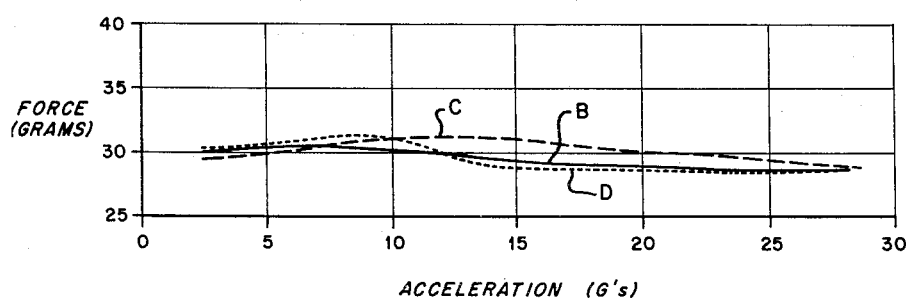
Fig. 11 is a singular graphic illustration of force vs. acceleration for comparing the performance of each of the performance bars of Figs. 7, 8, 9 and 10.

The negative springs 24, 25 for the device of Fig. 7, have a torque requiring 22 grams of operating force. Since the operating moment arm is two inches and since two springs 24, 25 are provided, a total of 22 inch grams of operating torque is required. This can be seen in Fig. 7 as the means of two curves for downstroke-return stroke for the performance bar A of Fig. 7 which has had the commutator brushes removed. The spread between the two middle curves 100, 101 is attributable to bearing friction additive on the downstroke and subtractive on the return stroke. With addition of brush friction, the total force required to displace the levers of the devices used to obtain Figs. 8-10 is 30 grams±1.5 grams for a range of zero to eight gravities as shown in Fig. 11. The prior art model, Fig. 6, requires a force of 15 to 20 grams to displace the lever without brushes. Curves 98 and 99 illustrate the downstroke and return stroke force curves. This downstroke operating force is within the capability of laboratory animals being considered for performance tasks.

Initially, each of the four test models A, B, C, D embodying the invention were subjected to acceleration forces up to 35 gravities. There was no perceptible movement of any of the levers of the four models. Each model A, B, C, D was mounted on a centrifuge arm 110 so that the gravitational force initially exerted on the lever would be tangential to the lever's downstroke direction. The indicating or signalling lamps hereinbefore referred to, but not shown, would have shown any movement of any of the levers. The same procedure was repeated in another test arrangement with zero to 35 gravities tangentially exerted on the levers in a direction 180 degrees opposite to the downstroke direction. At no time during the test did any of the levers show any movement.

Figure 12:
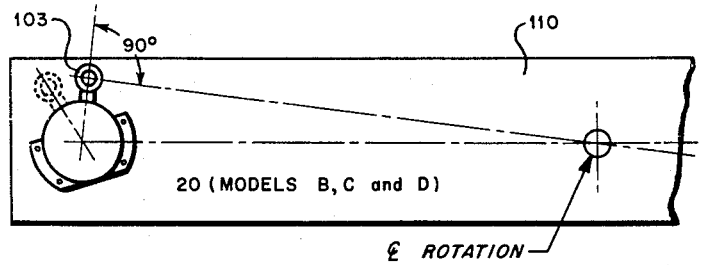
Fig. 12 is a schematic diagram of the test assembly for providing the information shown in Fig. 11.

Force vs. acceleration tests were then conducted using a test arrangement shown in Fig. 12 from which the results shown in Fig. 11 were obtained. These tests using positive acceleration were undertaken as diagrammed in Fig. 12 with the gravities being exerted on the levers tangentially in the lever's downstroke direction and with a calibrated brass weight 103 of 0.625 inch O.D. and 0.312 inch I.D. fitted on the T handle of the performance bar device 20, models B, C and D. Model A was not used in this test. For each calibrated weight, as shown in Table A hereinbelow, the rotational velocity of the centrifuge arm 110 was recorded when indicating lights showed that the lever had lever home position. The results of these tests on models B, C and D are shown in Fig. 11.

The magnitude of the force was computed from the standard basic equation of (1)    force $(f)$ = mass × acceleration, or (2)    $$f = \frac{wv^2}{gr} = \frac{w}{gr}\left(\pi \frac{2rn}{60}\right)^2$$

where:

$w$ = weight applied (grams)
$v$ = velocity (ft./sec.)
$r$ = radius of gyration (1.879 ft.)
$n$ = r.p.m. at which bar left home position in test
$g$ = acceleration due to gravity By combining like terms and substituting known constant values, Equation 2 becomes (3)    $f = .00064 \, wn^2$ Table A*

| Model | $w$(gms.) | $n$ (r.p.m.) | $n^2$ | $wn^2$ | $f$(gms.) | Acceleration |
|---|---|---|---|---|---|---|
| B | 12.0033 | 62.5 | 3,906 | 46,887 | 30.008 | 2.499$g$ |
|   | 7.9456 | 77.0 | 5,929 | 47,109 | 30.150 | 3.794$g$ |
|   | 4.0091 | 109 | 11,881 | 47,632 | 30.484 | 7.60$g$ |
|   | 2.0088 | 151 | 22,801 | 45,802 | 29.313 | 14.5°$g$ |
|   | 1.0257 | 209 | 43,681 | 44,803 | 28,674 | 27.59$g$ |
| C | 12.0033 | 62 | 3,844 | 46,140 | 29.530 | 2.46$g$ |
|   | 7.9456 | 76.5 | 5,852 | 46,499 | 29.759 | 3.74$g$ |
|   | 4.0091 | 109 | 11,881 | 47,632 | 30.484 | 7.60$g$ |
|   | 2.0088 | 155 | 24,025 | 48,261 | 30.887 | 51.37$g$ |
|   | 1.0257 | 210 | 44,100 | 45,233 | 28.949 | 28.22$g$ |
| D | 12.0033 | 62.5 | 3,906 | 46,887 | 30.008 | 2.499$g$ |
|   | 7.9456 | 77 | 5,929 | 47,109 | 30.150 | 3.79$g$ |
|   | 4.0091 | 110 | 12,160 | 48,510 | 31.046 | 7.74$g$ |
|   | 2.0088 | 150 | 22,500 | 45,198 | 28,926 | 14.40$g$ |
|   | 1.0257 | 209 | 43,681 | 44,803 | 28.673 | 27.95$g$ |

* A bar not submitted to test.

While a specific embodiment of the invention has been shown and described in accordance with the invention, it is understood that the invention is susceptible of many changes and modifications, as known to persons skilled in the art, and it is intended to cover all such changes and modifications coming within the scope of the appended claims.

What is claimed is:

1. In a device especially adapted for use in experimental psychology, a cylindrical housing having diametrically extending first and second stanchion means fixed therein, power drum means and takeup drum means disposed between and journaled in said first and second tanchion means, tape-like negative spring means connecting said take-up drum means with said power drum means and resiliently biasing said power drum means in one direction with a substantially constant torque independent of the relative angular position of said power drum means and independent of the amount of the earth's gravitational forces acting on the device, mass-balanced lever means fixed to said power drum means, electrical commutator brush means mounted in one end of said lever means, first and second parallel sector-shaped planar insulator means fixed in said housing, electrical commutator contact means carried by said insulator means and adapted to be sequentially engaged by said electrical commutator brush means as said lever means is angularly displaced for indicating the instantaneous position of said lever means as the latter is displaced.

2. In a device as set forth in claim 1, two angularly-spaced sector-shaped first spacer members disposed between said first insulator means and a wall of said housing, two angularly-spaced and sector-shaped second spacer members disposed at opposite ends of and between said first and second insulator means, and fastener means connecting all of said spacer members and said first and second insulator means to said housing wall.

3. In a device as set forth in claim 1, wherein said electrical commutator brush means comprise a bushing fixed in said end of said lever means, two cylindrical brushes slidably disposed in opposite ends of said bushing, an electrically conducting jumper wire electrically connecting said two brushes, and coiled spring means biasing said brushes outwardly of said bushing in opposite directions for lightly engaging said contact means.

4. In a device especially adapted for use in experimental psychology, a cylindrical housing having diametrically extending first and second stanchion means fixed therein, said first stanchion means having upper and lower ends of H-shaped transverse cross-section, a vertical cross-section of said stanchions being identical and I-beam shaped, power drum means and takeup drum means disposed between and journaled in said first and second stanchion means, tape-like spring means connecting said takeup drum means with said power drum means and resiliently biasing said power drum means in one direction with a substantially constant torque independent of the relative angular position of said power drum means and independent of the amount of the earth's gravitational forces acting on the device, mass-balanced lever means fixed to said power drum means, and having a handle end radially extending out of said housing, electrical commutator brush means mounted in an opposite end of said lever means, and electrical commutator contact means carried by said housing and adapted to be sequentially engaged by said electrical commutator brush means as said lever means is angularly displaced for indicating the instantaneous position of said lever means as the latter is displaced.

5. In a device especially adapted for use in experimental psychology, support means, power drum means and takeup drum means journaled in said support means, tape-like spring means connecting said takeup drum means with said power drum means and resiliently biasing said power drum means in one direction with a substantially constant torque independent of the relative angular position of said power drum means and independent of the amount of the earth's gravitational forces acting on the device, lever means fixed to said power drum means, electrical commutator brush means mounted in one end of said lever means, electrical commutator contact means carried by said support means and adapted to be sequentially engaged by said electrical commutator brush means as said lever is angularly displaced for use in determining the instantaneous position of said lever means as the latter is displaced, fixed stop means fixed to said support means in the upper end of the swing path of said lever means for limiting the return stroke movement of said lever means, and adjustable stop means including a U-shaped bracket mounting an adjustable lead screw threaded into a lead nut serving as an adjustable stop for limiting the downward stroke swing of said lever means.

6. In a device as set forth in claim 5, wherein said fixed and adjustable stop means are mounted internally of said housing, said housing having an access opening therein for permitting the adjustment of said lead screw.

7. In a device as set forth in claim 6, wherein said U-shaped bracket has a bed portion interconnecting head and tail stock portions, said bed portion having an elongated slot extending longitudinally thereof, a juxtaposed wall of said housing having a similarly shaped slot communicating with said slot in said bed portion and one elongated edge of said housing slot having a linear scale marked on the exterior thereof, and said adjustable lead nut having a marker portion protruding into said bed and housing slots and coacting with said scale.

8. In a device especially adapted for use in experimental psychology, a cylindrical cup-shaped housing receptacle portion, support means fixed in said receptacle portion, said support means including a stanchion block and a stanchion plate secured to said stanchion block, power drum means and takeup drum means disposed between and journaled in said stanchion block and said stanchion plate, tape-like spring means connecting said takeup drum means with said power drum means and resiliently biasing said power drum means in one direction with a substantially constant torque independent of the relative angular position of said power drum means and independent of the amount of the earth's gravitational forces acting on the device, lever means fixed to said power drum means, electrical commutator brush means mounted in one end of said lever means, a series of arcuately arranged electrical commutator contact means disposed on either side of said lever means and fixed in said receptacle portion and adapted to be sequentially engaged by said electrical commutator brush means as said lever means is angularly displaced for use in determining the instantaneous position of said lever means as the latter is displaced, the other end of said lever means radially extending beyond the periphery of said receptacle portion, a cylindrical cup-shaped housing cover removably secured to said support means and enclosing said receptacle portion, both said receptacle portion and said cover having an arcuate slot of a length of approximately sixty degrees formed in adjacent cylindrical wall rims thereof for accommodating the extension of said lever means out of said housing.

9. In a device as set forth in claim 8, wherein said receptacle portion has an opening formed in a wall thereof, and wherein said stanchion block has H-shaped upper and lower transverse ends connected together by means of a central web, said web being spaced from the bottom of said receptacle portion, and electrical cable means extending through said wall opening and between the bottom of said receptacle portion and said web to said contact means.

10. In a dynamical balanced device especially adapted for use in experimental psychology, a magesium cylindrical housing, magnesium support means fixed in said housing, magnesium power drum means and magnesium takeup drum means journaled by means of antifriction bearings in said support means, steel tape-like spring means connecting said take-up drum means with said power drum means and resiliently biasing said power drum means in one direction with a substantially constant torque independent of the relative angular position of said power drum means and independent of the amount of the earth's gravitational forces acting on the devices, mass-balanced lever means fixed to said power drum means, silver-graphite electrical commutator brush means mounted in one end of said lever means, and platinum electrical commutator contact means carried by said support means and adapted to be sequentially engaged by said electrical commutator brush means as said lever means is angularly displaced for use in determining the instantaneous position of said lever means as the latter is displaced, and one end of said lever means being made of brass and the other end of said lever means being made of magnesium.

References Cited in the file of this patent

UNITED STATES PATENTS

| | | |
|---|---|---|
| 1,067,972 | Comstock | July 22, 1913 |
| 1,977,546 | Fornelius | Oct. 16, 1934 |

FOREIGN PATENTS

| | | |
|---|---|---|
| 325,889 | Germany | Sept. 18, 1920 |